US012644767B2

(12) United States Patent
Xiao et al.

(10) Patent No.:  US 12,644,767 B2
(45) Date of Patent:      Jun. 2, 2026

(54) SPECTRUM MEASUREMENT DEVICE

(71) Applicant: HTC Corporation, Taoyuan City (TW)

(72) Inventors: Bo-Wen Xiao, Taoyuan City (TW);
Yen-Fang Cheng, Taoyuan City (TW)

(73) Assignee: HTC Corporation, Taoyuan City (TW)

( * ) Notice: Subject to any disclaimer, the term of this
patent is extended or adjusted under 35
U.S.C. 154(b) by 136 days.

(21) Appl. No.: 18/752,796

(22) Filed: Jun. 25, 2024

(65) Prior Publication Data

US 2025/0076115 A1      Mar. 6, 2025

Related U.S. Application Data

(60) Provisional application No. 63/535,316, filed on Aug.
30, 2023.

(51) Int. Cl.
  *G01J 3/18*           (2006.01)
  *G01J 3/02*           (2006.01)
  *G01J 3/06*           (2006.01)

(52) U.S. Cl.
  CPC ............... *G01J 3/18* (2013.01); *G01J 3/0208*
  (2013.01); *G01J 3/0237* (2013.01); *G01J*
  *3/0275* (2013.01); *G01J 3/06* (2013.01); *G01J*
  *2003/1861* (2013.01)

(58) Field of Classification Search
  CPC .......... G01J 3/18; G01J 3/0208; G01J 3/0237;
  G01J 3/0275; G01J 3/06; G01J
  2003/1861; G01J 3/2803; G01J 3/506;
  G01M 11/02; G01M 11/0207
  USPC ........................................................ 356/328
  See application file for complete search history.

(56) References Cited

U.S. PATENT DOCUMENTS

| | | | |
|---|---|---|---|
| 4,494,872 A | 1/1985 | Busch | |
| 5,867,264 A | 2/1999 | Hinnrichs | |
| 2001/0038453 A1* | 11/2001 | Jung ...................... | G01J 3/0251 |
| | | | 356/419 |
| 2001/0043330 A1* | 11/2001 | Jung ...................... | G01J 3/0216 |
| | | | 356/73 |
| 2005/0094934 A1* | 5/2005 | He ....................... | G02B 5/3025 |
| | | | 385/24 |

(Continued)

FOREIGN PATENT DOCUMENTS

| | | | |
|---|---|---|---|
| CN | 101813520 | | 8/2010 |
| DE | 3750569 | * | 5/1995 |

(Continued)

OTHER PUBLICATIONS

"Search Report of Europe Counterpart Application", issued on May 19, 2025, p. 1-p. 6.

(Continued)

*Primary Examiner* — Md M Rahman
(74) *Attorney, Agent, or Firm* — JCIPRNET

(57)           ABSTRACT

A spectrum measurement device includes a scanning light receiver, an optical component, and a processor. The scanning light receiver, on a plane, receives a plurality of light beams of a display image sequentially according to a scanning operation to generate a plurality of input light beams sequentially. The optical component receives the input light beams sequentially and generates a plurality of pieces of processed information. The processor obtains luminance and chromaticity information of the display image according to the processed information.

15 Claims, 7 Drawing Sheets

(56) References Cited

U.S. PATENT DOCUMENTS

| | | | | |
|---|---|---|---|---|
| 2007/0153268 A1* | 7/2007 | Panza | .................... | G01N 21/65 |
| | | | | 356/301 |
| 2012/0075628 A1* | 3/2012 | Sano | .................... | G01J 3/0232 |
| | | | | 356/326 |
| 2022/0412803 A1 | 12/2022 | Sanden et al. | | |
| 2024/0045302 A1* | 2/2024 | Davis | ........................ | G01J 3/42 |

FOREIGN PATENT DOCUMENTS

| | | | | | |
|---|---|---|---|---|---|
| JP | H0850057 | 2/1996 | | | |
| JP | 2010271246 | 12/2010 | | | |
| KR | 20250116144 A | * | 7/2025 | ........... | G02F 1/1309 |
| TW | 201423064 | 6/2014 | | | |
| WO | 2015133476 | 9/2015 | | | |

OTHER PUBLICATIONS

"Office Action of Taiwan Counterpart Application", issued on Feb. 27, 2025, p. 1-p. 6.

* cited by examiner

400

700

SPECTRUM MEASUREMENT DEVICE

CROSS-REFERENCE TO RELATED APPLICATION

This application claims the priority benefit of U.S. provisional application Ser. No. 63/535,316, filed on Aug. 30, 2023. The entirety of the above-mentioned patent application is hereby incorporated by reference herein and made a part of this specification.

TECHNICAL FIELD

The disclosure relates to a spectrum measurement device, and in particular to a spectrum measurement device which can obtain wavelength energy data of a two-dimensional entire surface at one time.

DESCRIPTION OF RELATED ART

The conventional spectrum measurement instrument performs various optical processing operations sequentially after the light beam is incident through the lens, so as to angularly disperse the wide wavelength range light of the incident light beam into different narrow wavelength range lights to spatially reach different areas of the linear sensor (Linear CCD) to obtain the wavelength energy of each narrow wavelength range, and further calculations are performed to obtain the measured luminance and chromaticity information. However, in the conventional technology, if the entire surface information needs to be measured, a rotation or translation adjustment of the machine needs to be added to adjust the angle and position relationship between the measurement instrument and the object to be measured, which seriously reduces the convenience of use.

SUMMARY

The disclosure provides a spectrum measurement device which can obtain wavelength energy data of a two-dimensional entire surface at one time.

The spectrum measurement device of the disclosure includes a scanning light receiver, an optical component, and a processor. The scanning light receiver, on a plane, receives multiple light beams of a display image sequentially according to a scanning operation to generate multiple input light beams sequentially. The optical component receives the input light beam sequentially and generates multiple pieces of processed information. The processor is coupled to the light source component and obtains luminance and chromaticity information of the display image according to the processed information.

Based on the above, the spectrum measurement device of the disclosure sequentially receives the multiple light beams of the display image of the plane in a scanning manner through the scanning light receiver, and performs sensing according to the received light beams to obtain the wavelength energy data of the two-dimensional entire surface of the display image.

DESCRIPTION OF THE EMBODIMENTS

Figure 1:
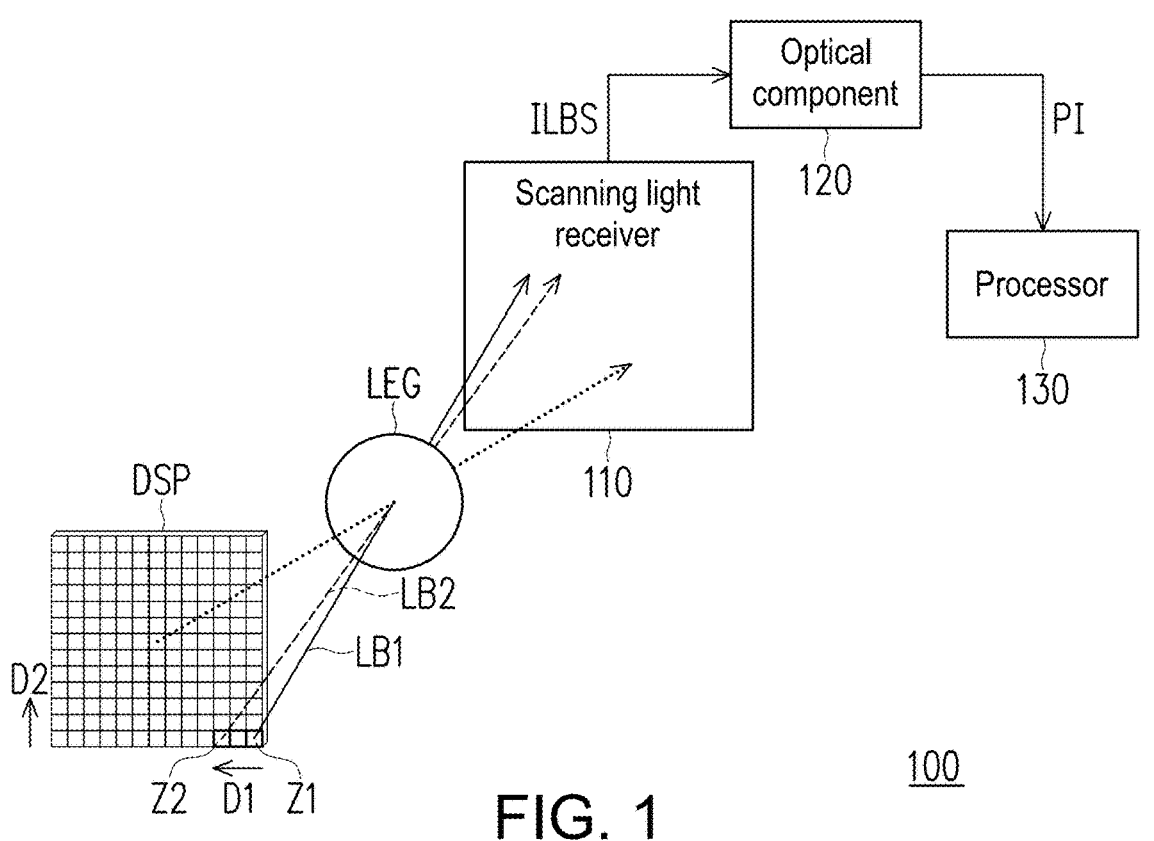
FIG. 1 is a schematic diagram of a spectrum measurement device according to an embodiment of the disclosure.

Please refer to FIG. 1. FIG. 1 is a schematic diagram of a spectrum measurement device according to an embodiment of the disclosure. A spectrum measurement device 100 includes a scanning light receiver 110, an optical component 120, and a processor 130. The scanning light receiver 110 is used to sequentially receive each light beam LB1 to LB2 sent by a display DSP through a lens element group LEG according to a scanning operation, and to obtain multiple input light beam ILBS respectively. In this embodiment, the scanning light receiver 110 may first receive the light beam LB1 provided by a display part Z1 in the display DSP, then, according to a preset scanning sequence, along a first axis direction D1 of the plane where the display DSP is located, receive light beams (such as the light beam LB2) sent by different display parts (such as a display part Z2) in the display DSP sequentially. After receiving of light beams sent by display parts in the same row of the display parts Z1, Z2 are completed, the scanning light receiver 110 may, along a second axis direction D2 of the plane where the display DSP is located, scan multiple display parts in a row above the display parts Z1, Z2, and receive each light beam sent by the display parts respectively.

The above-mentioned scanning operation may be performed continuously, the scanning light receiver 110 may receive all light beams corresponding to the display image sent by the display DSP separately and in a time-sharing manner, so as to obtain the multiple input light beams ILBS.

On the other hand, the optical component 120 is coupled to the scanning light receiver 110. The optical component 120 receives the input light beams ILBS sequentially, and performs optical processing operations on the input light beams ILBS, so as to generate multiple pieces of processed information PI sequentially. In this embodiment, the optical component 120 may perform diffraction and linear sensing operations on the input light beam ILBS, and obtain the processed information PI according to the linear sensing operations. Further, the optical component 120 may transmit the processed information PI to the processor 130. The processor 130 may be coupled to the optical component 120, and is used to obtain luminance and chromaticity information of the display image generated by the display DSP according to the processed information PI.

In this embodiment, through the scanning operation of the scanning light receiver 110, the spectrum measurement device 100 may receive the two-dimensional light beam of the complete plane of the display image at one time, and thereby the luminance and chromaticity information of the display image is sensed, which improves the working efficiency of the spectrum measurement device 100.

Incidentally, the processor 130 may be a processor or a controller circuit with computing capabilities.

Figure 2:
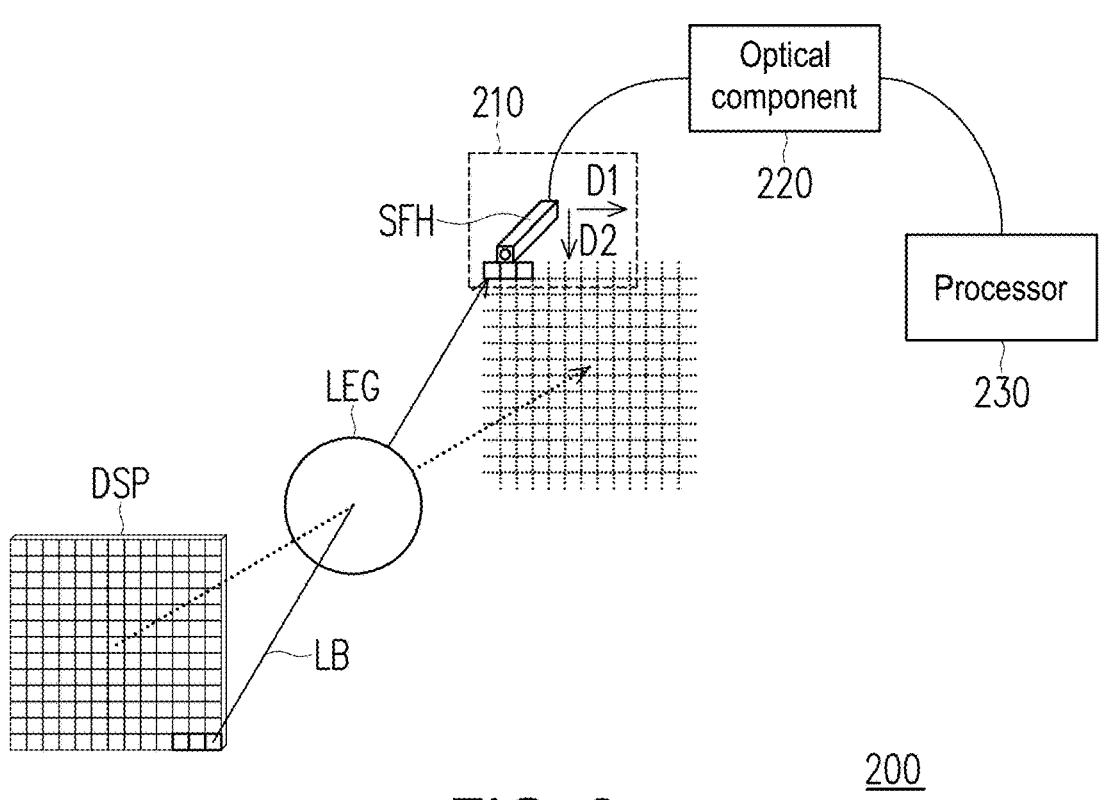
FIG. 2 is a schematic diagram of the spectrum measurement device according to another embodiment of the disclosure.

Please refer to FIG. 2. FIG. 2 is a schematic diagram of the spectrum measurement device according to another embodiment of the disclosure. A spectrum measurement device 200 includes a scanning light receiver 210, an optical component 220, and a processor 230. In this embodiment, the scanning light receiver 210 includes a light-receiving lens SFH. The light-receiving lens SFH may be connected to an actuator (not shown). The actuator may carry and drive the light-receiving lens SFH to move along the first axis direction D1 or the second axis direction D2 of a plane, so as to sequentially receive multiple light beams LB of the display image sent by the display DSP, and sequentially obtain multiple input light beams.

The light-receiving lens SFH may be coupled to the optical component 220 through optical fibers, and may sequentially transmit multiple input light beams to the optical component 220 through the optical fibers. In this embodiment, the optical component 220 includes a slit device, a reflector, and a diffraction grating. The slit device, the reflector, and the diffraction grating may be arranged sequentially to receive each input light beam sequentially and generate each piece of corresponding processed information PI sequentially. The processor 230 may obtain the luminance and chromaticity information of the display image according to the processed information PI.

In this embodiment, by adjusting the movement of the light-receiving lens on the plane, the spectrum measurement device 200 may complete the measurement operation of the luminance and chromaticity information of the display image, and further obtain the wavelength energy data of the two-dimensional entire surface of the display image.

Figures 3A, 3B:
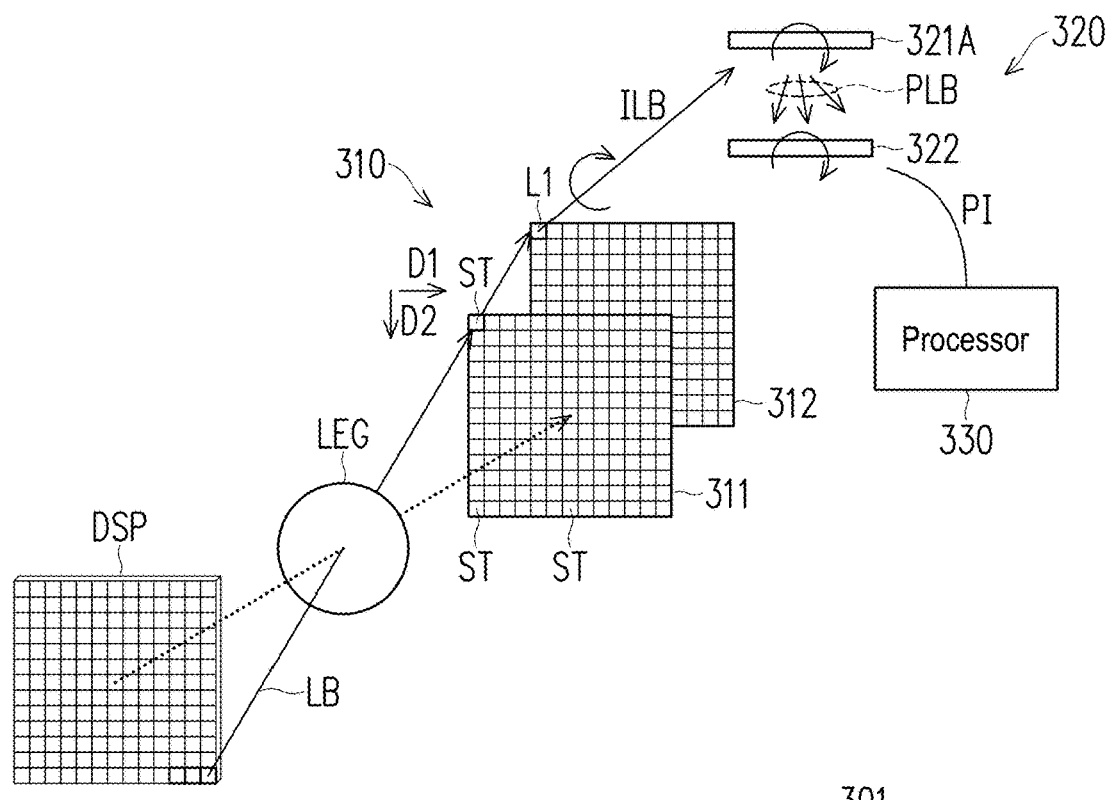
FIG. 3A and FIG. 3B are schematic diagrams of different implementations of the spectrum measurement device according to another embodiment of the disclosure.

Please refer to FIG. 3A and FIG. 3B. FIG. 3A and FIG. 3B are schematic diagrams of different implementations of the spectrum measurement device according to another embodiment of the disclosure. In FIG. 3A, a spectrum measurement device 300 includes a scanning light receiver 310, an optical component 320, and a processor 330. In this embodiment, the scanning light receiver 310 includes a slit array 311 and a focusing lens 312. The slit array 311 has multiple slits ST arranged in an array, each of the slits ST may be opened sequentially according to a scanning sequence, and through the opened slits ST, each light beam LB of the display image generated by the display DSP is received sequentially. The slit array 311 may perform a scanning operation according to the first axis direction D1 or the second axis direction D2 on the plane, and open each slit ST sequentially. By sequentially opening the respective slits ST at different two-dimensional light beam positions on the slit array 311, each light beam LB of the display image generated by the display DSP may be sequentially made to pass through each opened slit ST, lights outside the measurement position are blocked, and the measured light beam is transmitted to the focusing lens 312.

The focusing lens 312 and the slit array 311 are arranged to overlap with each other. The slit array 311 may be disposed between the lens element group LEG and the focusing lens 312, and the focusing lens 312 may be disposed between the slit array 311 and the optical component 320. The focusing lens 312 is used to focus the incoming light beam LB to generate the input light beam ILB, and to guide the input light beam ILB to project to the optical component 320.

The optical component 320 includes a reflection-type diffraction grating 321A and a linear sensor 322 arranged to overlap with each other; in which the linear sensor 322 receives the reflected light generated by the reflection-type diffraction grating 321A. The focusing lens 312 allows the input light beam ILB to be projected to the reflection-type diffraction grating 321A. The reflection-type diffraction grating 321A is used to angularly disperse the wide wavelength range light of the input light beam ILB into different narrow wavelength range lights PLB, and allow the narrow wavelength range lights PLB to spatially reach different areas of the linear sensor 322. In this way, the linear sensor 322 may sense the wavelength energy of each narrow wavelength range, so as to generate the processed information PI. The processor 330 may further obtain the luminance and chromaticity information to be measured.

It is worth mentioning that the focal length of the focusing lens 312 is adjustable in a dynamic manner. Moreover, the focusing lens 312 may be a single lens or may comprise multiple unit lens elements, and the disclosure is not limited thereto. When the focusing lens 312 comprises the multiple unit lens elements, the positions of the unit lens elements may be disposed corresponding to the positions of the multiple slits in the slit array 311 respectively.

In this embodiment, through sequentially opening the slits at the different positions in the slit array 311, and through the positions of the focusing lens 312 and the angle position relationship corresponding to the reflection-type diffraction grating 321A and the linear sensor 322, the measurement operation of the entire surface of the display image can be achieved.

In FIG. 3B, a spectrum measurement device 300' includes the scanning light receiver 310, an optical component 320', and the processor 330. In this embodiment, the scanning light receiver 310 and the processor 330 are the same as the embodiment in FIG. 3A, so details will not be repeated here. Compared with the embodiment in FIG. 3B, in the optical component 320', the linear sensor 322 receives transmitted lights generated by a transmission-type diffraction grating 321B.

Figure 4:
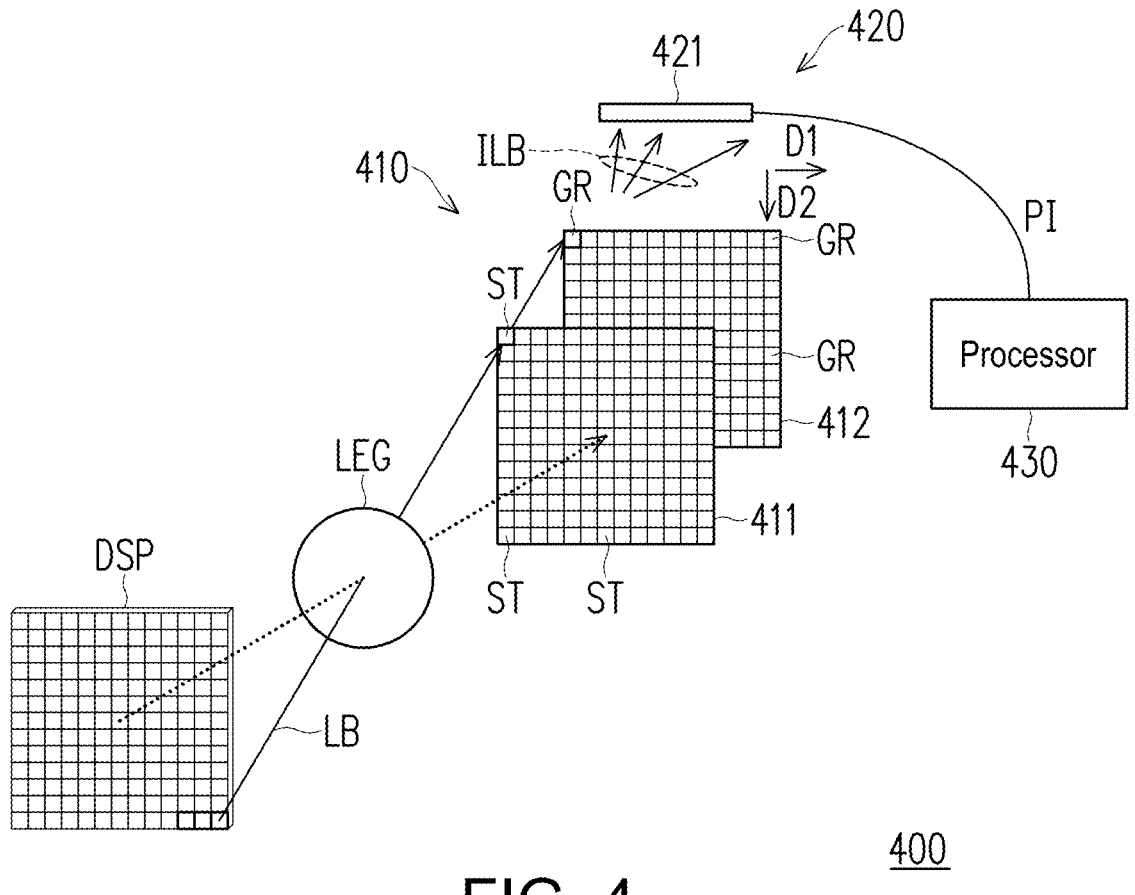
FIG. 4 is a schematic diagram of the spectrum measurement device according to another embodiment of the disclosure.

Please refer to FIG. 4. FIG. 4 is a schematic diagram of the spectrum measurement device according to another embodiment of the disclosure. A spectrum measurement device 400 includes a scanning light receiver 410, an optical component 420, and a processor 430. In this embodiment, the scanning light receiver 410 includes a slit array 411 and a grating array 412 comprising multiple diffraction-type gratings GR. The slit array 411 has the same function as the slit array 311 in the previous embodiment, so details will not be repeated here. The grating array 412 is arranged to overlap with the slit array 411. The multiple diffraction-type gratings GR on the grating array 412 correspond to multiple slits ST in the slit array 411 respectively. When a corresponding slit ST1 is opened, each diffraction-type grating GR is used to receive the corresponding light beam LB through the lens element group LEG, and is used to diffract each light beam LB to disperse the light beam LB into different narrow wavelength range lights, so as to generate multiple input light beams ILB.

The input light beam ILB is projected to the optical component 420. The optical component 420 includes a linear sensor 421. The input light beams ILB generated by the diffraction-type grating GR is projected to different areas of one dimension on the linear sensor 421 respectively.

In this embodiment, when the slit array 411 opens the slits ST sequentially along the first axis direction D1 or the second axis direction D2, the linear sensor 421 may perform movements along the first axis direction D1 or the second axis direction D2 synchronously, and sense the chromaticity and luminance of the input light beam ILB generated by the diffraction-type grating GR. In this way, the spectrum measurement device 400 can achieve the sensing operation of the chromaticity and luminance of the entire plane surface of the display image.

Figure 5A:
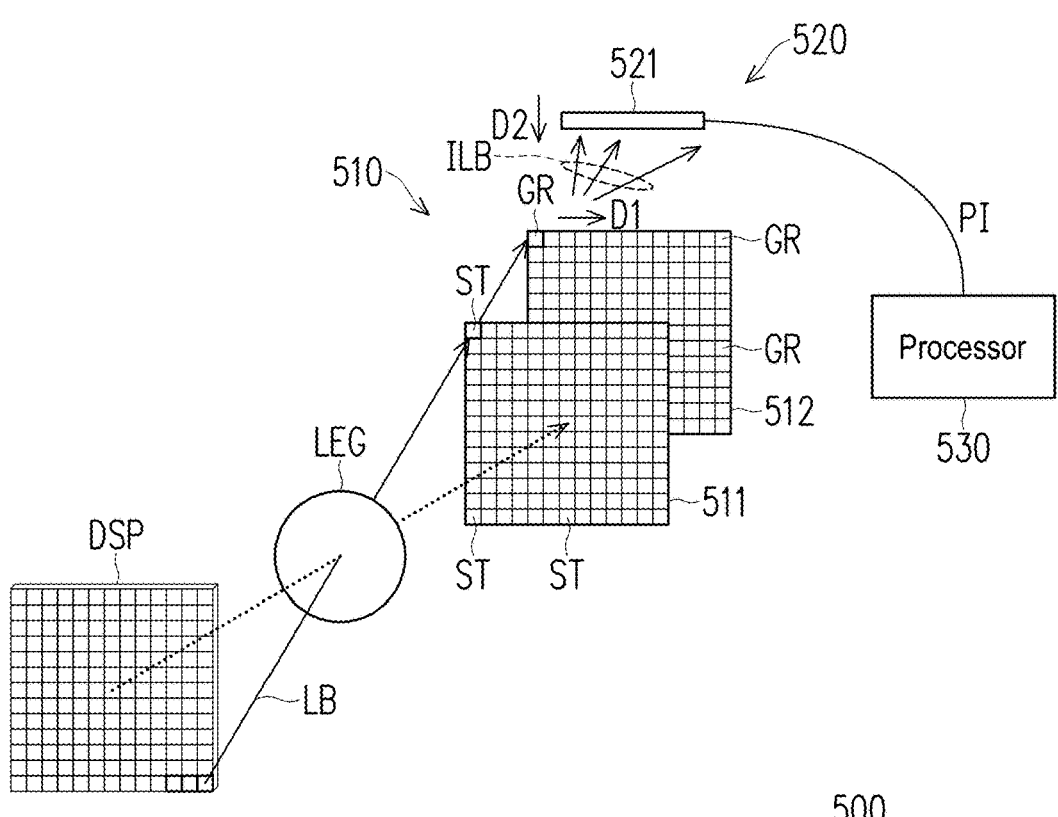
FIG. 5A and FIG. 5B are schematic diagrams of different implementations of the spectrum measurement device according to another embodiment of the disclosure.
Figure 5B:
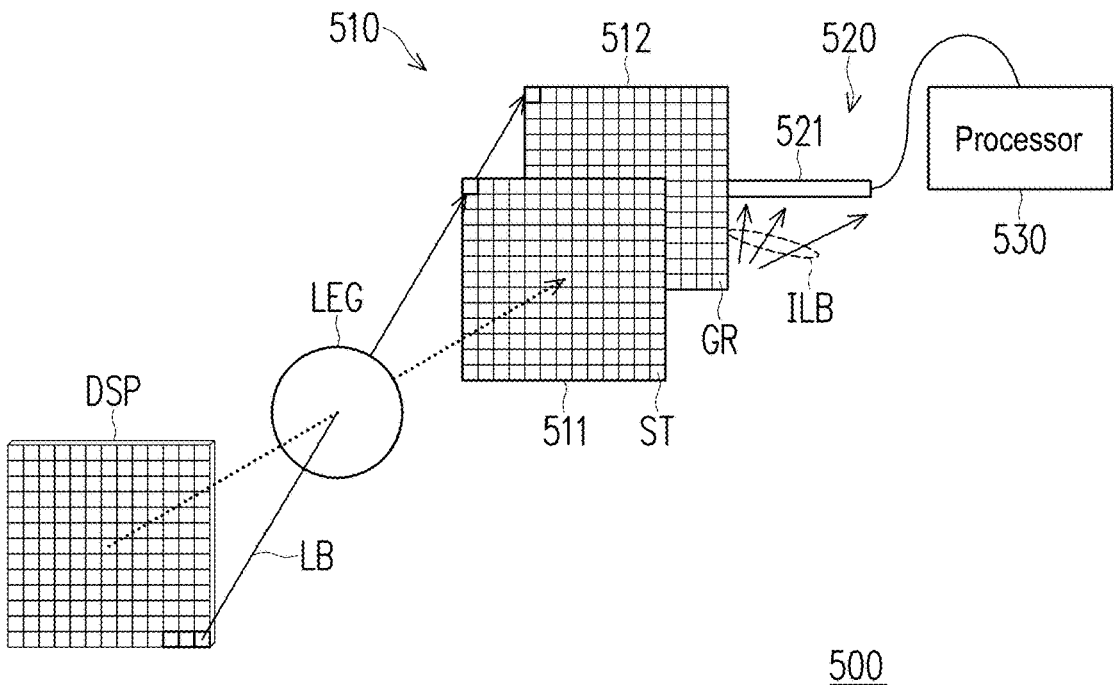

Please refer to FIG. 5A and FIG. 5B. FIG. 5A and FIG. 5B are schematic diagrams of different implementations of the spectrum measurement device according to another embodiment of the disclosure. In FIG. 5A, a spectrum measurement device 500 includes a scanning light receiver 510, an optical component 520, and a processor 530. In this embodiment, the scanning light receiver 510 includes a slit array 511 comprising a plurality of slits ST and a grating array 512 comprising a plurality of diffraction-type gratings GR. The scanning light receiver 510 has the same structure and operation mode as the scanning light receiver 410 of the previous embodiment, so details will not be repeated here.

The optical component 520 includes a linear sensor 521. The position of the linear sensor 521 may be adjusted corresponding to the optical path of the input light beam ILB provided by the diffraction-type grating GR. In this embodiment, the linear sensor 521 may have a relatively longer length compared with the linear sensor 421. When the slit array 511 and the grating array 512 sequentially open the slits ST and the diffraction-type gratings GR respectively along the first axis direction D1, the linear sensor 521 does not need to move along the first axis direction D1, and through the different areas, the input light beam ILB provided by the opened diffraction-type grating GR is received. When the slit array 511 and the grating array 512 move along the second axis direction D2 to open the slit ST and the diffraction-type grating GR, the linear sensor 521 may correspondingly move along the second axis direction D2 to effectively receive the input light beam ILB provided by the opened diffraction-type grating GR. As shown in FIG. 5B, when the opened slit ST and the diffraction-type grating GR are moved below the slit array 511 and the grating array 512, the linear sensor 521 correspondingly moves downward along the second axis direction D2 to effectively receive the input light beam ILB.

According to the implementations in FIG. 5A to FIG. 5B, it may be known that, by sequentially opening the slit ST and the diffraction-type grating GR, and adaptively adjusting the position of the linear sensor 521, the spectrum measurement device 500 can achieve the sensing operation of the wavelength energy data of the two-dimensional entire surface of the display image at one time.

Figure 6A:
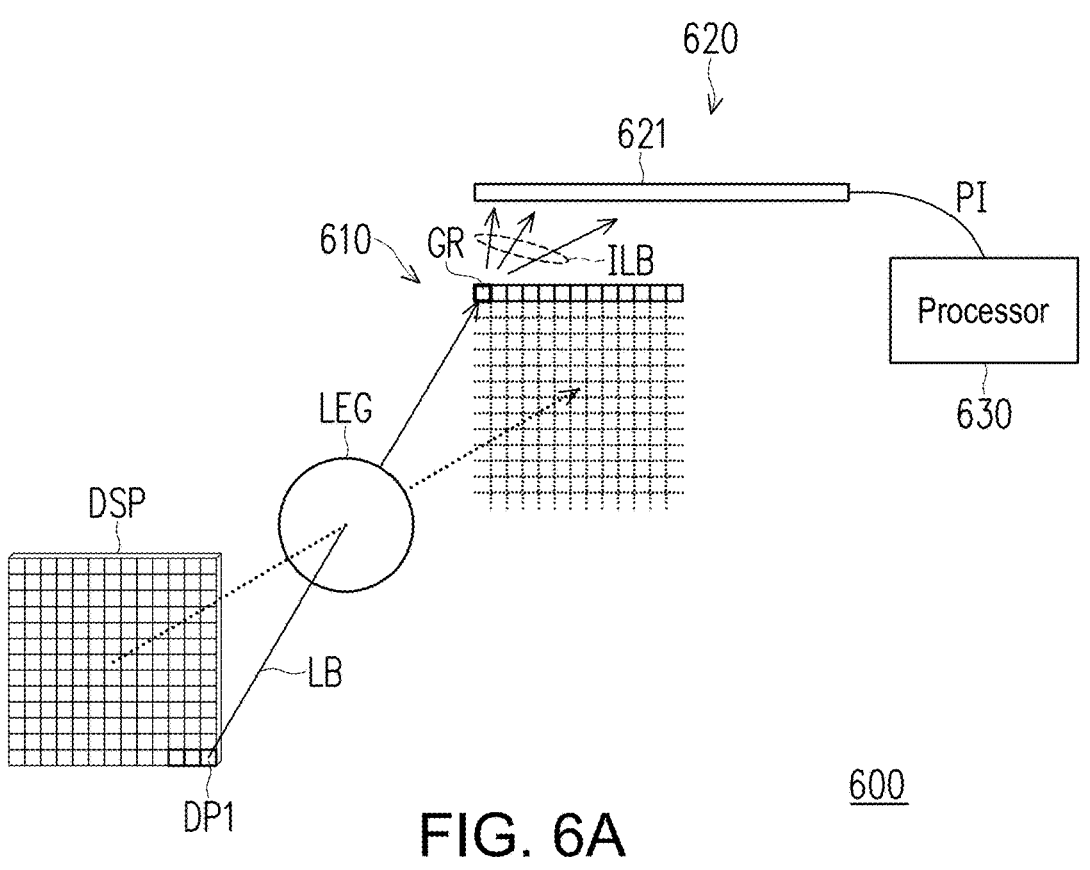
FIG. 6A to FIG. 6C are schematic diagrams of the spectrum measurement device according to another embodiment of the disclosure.
Figure 6B:
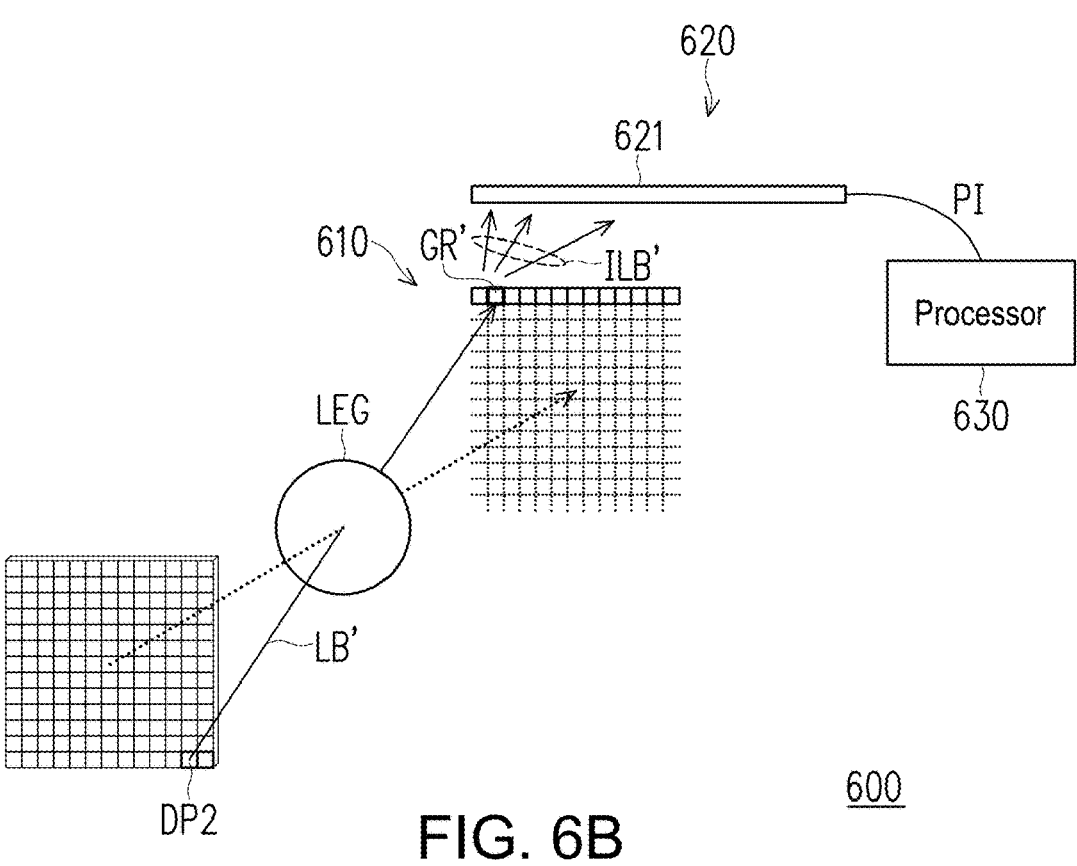
Figure 6C:
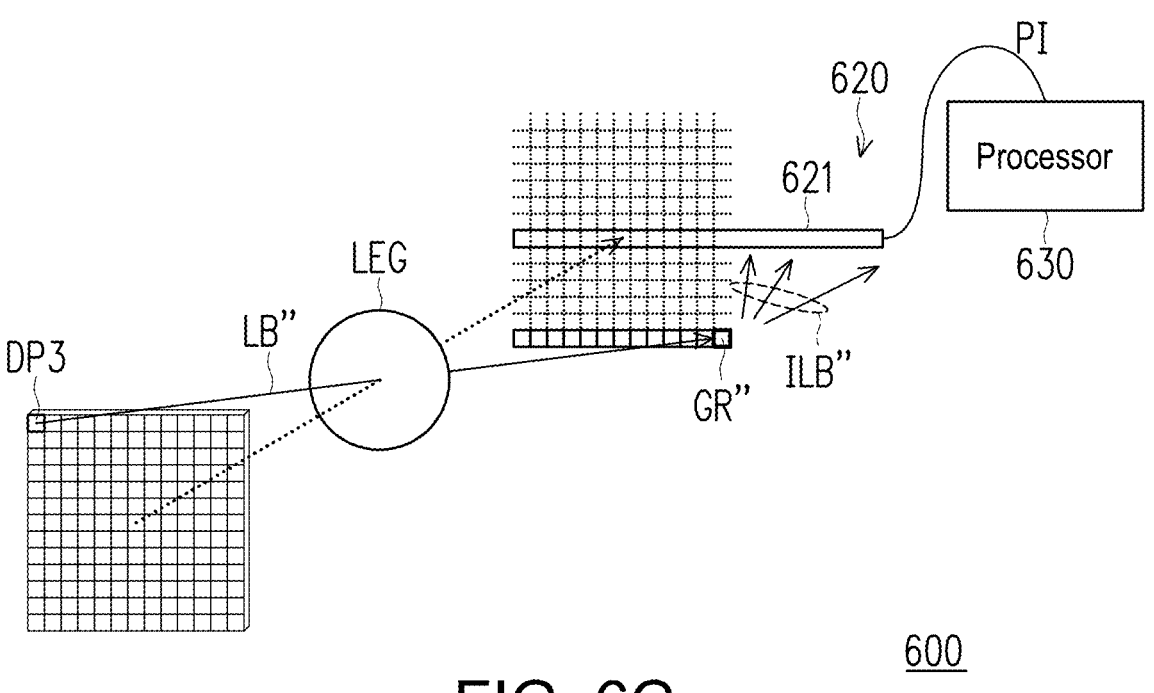

The spectrum measurement device 500 may drive the linear sensor 521 to move by disposing an actuator (not shown). The related technology may be carried out using methods well known to persons with ordinary knowledge in the art, and the disclosure is not limited thereto. Please refer to FIG. 6A to FIG. 6C. FIG. 6A to FIG. 6C are schematic diagrams of the spectrum measurement device according to another embodiment of the disclosure. A spectrum measurement device 600 includes a scanning light receiver 610, an optical component 620, and a processor 630. The scanning light receiver 610 includes a linear diffraction grating 611. In FIG. 6A, the diffraction grating GR receives the light beam LB of the display image provided by a display part DP1 of the display DSP through the lens element group LEG. The diffraction grating GR causes the light beam LB to generate diffraction, so as to providing the multiple input light beams ILB to different areas of the linear sensor 621 of the optical component 620. In this way, the linear sensor 621 can measure the wavelength energy of each narrow wavelength range, so as to generate the processed information PI.

Next, in FIG. 6B, another diffraction grating GR' of the linear diffraction grating 611 receives a light beam LB' of the display image provided by a display part DP2 of the display DSP through the lens element group LEG. The diffraction grating GR' causes the light beam LB' to generate diffraction, so as to provide the multiple input light beams ILB' to different areas of the linear sensor 621. In this way, the linear sensor 621 can measure the wavelength energy of each narrow wavelength range, so as to generate the processed information PI.

In the operations of FIG. 6A and FIG. 6B, the position of the linear sensor 621 may be fixed without moving.

In FIG. 6C, when a display part DP3 of the display DSP provides a light beam LB" of the display image, the linear diffraction grating 611 may correspondingly move along the second axis direction D2 to receive the light beam LB". In this embodiment, the linear diffraction grating 611 is moved downward, and the diffraction grating GR" therein receives the light beam LB" and generates an input light beam ILB" by diffracting the light beam LB". In addition, the linear sensor 621 may also move synchronously along the second axis direction D2 and move downward to the projection direction of the input light beam ILB". The input light beam ILB" is projected to different areas of the linear sensor 621. In this way, the linear sensor 621 may measure the wavelength energy of each narrow wavelength range, so as to generate the processed information PI.

According to the implementations in FIG. 6A to FIG. 6B, it may be known that, together with the adjusting operation of the display part of the display DSP, the spectrum measurement device 600 may adaptively adjust the positions of the linear diffraction grating 611 and the linear sensor 621, and the sensing operation of the wavelength energy data of the two-dimensional entire surface of the display image can be achieved at one time.

Similarly, the spectrum measurement device 600 may drive the linear diffraction grating 611 and the linear sensor 621 to move by disposing an actuator (not shown). The related technology may be carried out using methods well known to persons with ordinary knowledge in the art, and the disclosure is not limited thereto.

Figure 7:
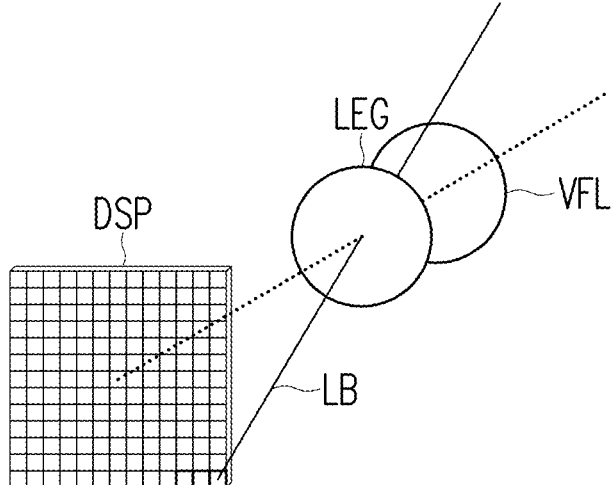
FIG. 7 is a partial structural diagram of the spectrum measurement device according to an embodiment of the disclosure.

Please refer to FIG. 7 below. FIG. 7 is a partial structural diagram of the spectrum measurement device according to an embodiment of the disclosure. In a spectrum measurement device 700, the lens element group LEG may have phase path overlap with a zoom lens VFL and be disposed in the traveling direction of the light beam LB projected by the display DSP. The light beam LB is used to project to the scanning light receiver of the spectrum measurement device 700. That is to say, the lens element group LEG in this embodiment is disposed between the display DSP and the scanning light receiver, while the zoom lens VFL is disposed between the lens element group LEG and the scanning light receiver.

The focal length of the zoom lens VFL is adjustable in a dynamic manner. The zoom lens VFL may introduce light from a specific area into the slit, increase spatial resolution, and allow the controllable slit to block light outside the measurement position.

Incidentally, this embodiment may be applied to the embodiments in FIG. 3A to FIG. 6C.

In summary, the spectrum measurement device of the disclosure receives the multiple light beams of the display image through scanning, and thereby senses the luminance and chromaticity information of the light beam of the two-dimensional entire surface of the display image. In this way, the spectrum measurement device of the disclosure can obtain the wavelength energy data of the two-dimensional entire surface at one time, which can greatly improve the convenience of use of the spectrum measurement device.

What is claimed is:

1. A spectrum measurement device, comprising:
a scanning light receiver, receiving a plurality of light beams of a display image sequentially on a plane according to a scanning operation to generate a plurality of input light beams sequentially;
an optical component, receiving the input light beams sequentially and generating a plurality of pieces of processed information; and
a processor, coupled to the light source component, and obtaining luminance and chromaticity information of the display image according to the processed information,
wherein the optical component comprises a linear sensor, wherein the diffracted light beams are projected to different areas of the linear sensor respectively, and the linear sensor is configured to obtain wavelength energy of each of the diffracted light beams.

2. The spectrum measurement device as claimed in claim 1, wherein the scanning light receiver comprises:
a light-receiving lens, moving in a first axis direction or a second axis direction of the plane according to the scanning operation.

3. The spectrum measurement device as claimed in claim 2, wherein the optical component comprises:
a slit device, a reflector, and a diffraction grating, wherein the slit device, the reflector, and the diffraction grating are arranged sequentially to receive each of the input light beams and generate each piece of the processed information sequentially.

4. The spectrum measurement device as claimed in claim 1, wherein the scanning light receiver comprises:
a slit array, having a plurality of slits, wherein each of the slits is opened sequentially according to a scanning sequence, so as to receive each of the light beams sequentially; and
a focusing lens, arranged to overlap with the slit array, and receiving each of the light beams and focusing each of the light beams to generate each of the input light beams.

5. The spectrum measurement device as claimed in claim 4, wherein the optical component comprises:
a diffraction grating, receiving each of the input light beams, and diffracting each of the input light beams to generate a plurality of diffracted light beams.

6. The spectrum measurement device as claimed in claim 4, wherein the focusing lens comprises a plurality of unit lens elements, and the unit lens elements are arranged corresponding to the slits respectively.

7. The spectrum measurement device as claimed in claim 4, further comprising:

a lens element group, disposed between a display providing the display image and the scanning light receiver; and
a zoom lens, arranged to overlap with the lens element group, and disposed between the lens element group and the scanning light receiver.

8. The spectrum measurement device as claimed in claim 7, wherein the zoom lens has an adjustable focal length.

9. The spectrum measurement device as claimed in claim 8, wherein the optical component comprises:
the linear sensor corresponds to the linear diffraction grating to move along a second axis direction.

10. The spectrum measurement device as claimed in claim 1, wherein the linear sensor receives a light generated by a diffraction grating.

11. The spectrum measurement device as claimed in claim 1, wherein the scanning light receiver comprises:
a slit array, having a plurality of slits, wherein each of the slits is opened sequentially according to a scanning sequence, so as to receive each of the light beams sequentially; and
a plurality of diffraction-type gratings, arranged corresponding to the slits respectively, wherein each of the diffraction-type gratings is configured to receive each of the light beams, and to diffract each of the light beams to generate the plurality of input light beams.

12. The spectrum measurement device as claimed in claim 11, wherein each of the slits is opened sequentially along a first axis direction or a second axis direction according to the scanning sequence, and the linear sensor corresponds to each of the slits being opened to perform movements along the first axis direction or the second axis direction.

13. The spectrum measurement device as claimed in claim 11, wherein each of the slits is opened sequentially along a first axis direction or a second axis direction according to the scanning sequence, in response to each of the slits being opened along the second direction, the linear sensor corresponds to each of the slits being opened to perform movements along the second axis direction.

14. The spectrum measurement device as claimed in claim 1, wherein the scanning light receiver comprises:
a linear diffraction grating, receiving a plurality of first light beams distributed along a first axis direction among the light beams, wherein the linear diffraction grating moves along a second axis direction according to a scanning sequence, and the first axis direction is orthogonal to the second axis direction.

15. The spectrum measurement device as claimed in claim 14, further comprising:
a lens element group, disposed between a display providing the display image and the scanning light receiver; and
a zoom lens, arranged to overlap with the lens element group, and disposed between the lens element group and the scanning light receiver.

* * * * *